(12) United States Patent
Vollmer et al.

(10) Patent No.: US 11,899,037 B2
(45) Date of Patent: Feb. 13, 2024

(54) METHOD FOR RECOGNIZING SEQUENCES OF MOTIONS AND PASSING RECOGNITION SYSTEM

(71) Applicant: Kaba Gallenschütz GmbH, Bühl (DE)

(72) Inventors: Arno Vollmer, Achern (DE); Gerald Droll, Bühl (DE)

(73) Assignee: KABA GALLENSCHÜTZ GMBH, Bühl (DE)

( * ) Notice: Subject to any disclaimer, the term of this patent is extended or adjusted under 35 U.S.C. 154(b) by 192 days.

(21) Appl. No.: 17/318,152

(22) Filed: May 12, 2021

(65) Prior Publication Data

US 2021/0356494 A1    Nov. 18, 2021

(30) Foreign Application Priority Data

May 14, 2020    (EP) .................................... 20174833

(51) Int. Cl.
*G01P 13/00*    (2006.01)
*G01V 8/20*    (2006.01)

(52) U.S. Cl.
CPC .............. *G01P 13/00* (2013.01); *G01V 8/20* (2013.01)

(58) Field of Classification Search
CPC .............. G01V 8/10; G01V 8/20; G01P 13/00
See application file for complete search history.

(56) References Cited

U.S. PATENT DOCUMENTS

2017/0169643 A1    6/2017    Huff

FOREIGN PATENT DOCUMENTS

| CN | 106600777 B | 2/2019 | | |
|---|---|---|---|---|
| DE | 102005002357 A1 | 7/2006 | | |
| EP | 0828233 B1 | 3/1998 | | |
| EP | 0828433 A1 | 3/1998 | | |
| EP | 1903356 A1 | * | 3/2008 | ............... G01V 8/20 |
| EP | 1873442 B2 | * | 12/2011 | ............... F16P 3/14 |
| WO | 9637115 A1 | 11/1996 | | |

OTHER PUBLICATIONS

Galvis et al., "A Wireless Near-IR Retro-Reflective Profiling Sensor", Ground/Air Multisensor Interoperability, Integration, and Networking for Persistent ISR III SPIE vol. 8389, May 11, 2012, 12 pages DOI: 10.1117/12.918596.

Sartain, "Profiling sensor for ISR applications", Laser-based Micro- and Nanopackaging and Assembly II, Proc. of SPIE vol. 6963, Apr. 3, 2008, 12 pages, DOI: 10.1117/12.796194.

* cited by examiner

*Primary Examiner* — Kevin K Pyo
(74) *Attorney, Agent, or Firm* — CANTOR COLBURN LLP

(57) ABSTRACT

A method for non-contact monitoring of at least one sequence of motions having several states of motion with a passing recognition system, including a floor edge, in particular for installing on a floor of a passing area to be monitored, at least one first sensor strip extending along a vertical vector and including several sensors for detecting states of motion within a detection area of the sensors, includes a computing unit for evaluating the states of motion and/or the sequence of motions. Furthermore, a computer-implemented method as well as a passing recognition system for performing the method is related.

13 Claims, 7 Drawing Sheets

METHOD FOR RECOGNIZING SEQUENCES OF MOTIONS AND PASSING RECOGNITION SYSTEM

CROSS-REFERENCE TO RELATED APPLICATIONS

This application claims priority to European Patent Application No. 20174833.2, filed on May 14, 2020, the contents of which are hereby incorporated by reference in their entirety.

TECHNICAL FIELD

The present disclosure relates to a method for non-contact monitoring of at least one sequence of motions having several states of motion with a passing recognition system, including a floor edge, in particular for installing on a floor of a passing area to be monitored, at least one first sensor strip extending along a vertical vector and including several sensors for detecting states of motion within a detection area of the sensors, a computing unit for evaluating the states of motion and/or the sequence of motions.

BACKGROUND

Methods are known in the state-of-the-art, which recognize sequences of motions, in particular individuals passing through detection areas, respectively entering said areas and/or leaving said areas, with detection units. At entrances and exits in buildings or areas, in particular access-restricted areas are used, for example, turnstiles, personal manlocks or barriers for the targeted entry control, respectively exit control.

The known solutions are disadvantageous in that recognizing individuals, in particular several individuals following each other closely, is not performed reliably enough. Another disadvantage is that a high extension of the passing recognition system is required for performing the method.

SUMMARY

The present disclosure overcomes the existing disadvantages, at least partially. In particular, the present disclosure provides a method and/or a passing recognition system, wherein the passing recognition system allows for recognizing the individual sequences of motions at high reliability and/or at small distance between two individuals following each other or other mobile objects.

This is achieved with the independent claim 1. Advantageous further developments of the method are indicated in the description and in the Figures. Furthermore, the disclosure provides a computer-implemented method according to claim 12 and/or a passing recognition system according to claim 13. Advantageous further developments or the computer-implemented method and of the passing recognition system are indicated in the dependent claims, the description and the Figures.

Features and details, which are described in conjunction with the inventive method, are in this case also valid in conjunction with the inventive computer-implemented method and the inventive passing recognition system and vice versa. In this case, the features mentioned in the description and in the claims can be essential to the disclosure, respectively individually on their own or in combination.

In particular, a passing recognition system is protected, in which the inventive method, in particular the method according to any of the claims 1 to 12 is executable, as well as a method, which can be executed with the inventive passing recognition system according to any of the claims 13 to 15.

According to a first aspect of the present disclosure, a method is indicated for non-contact monitoring of at least one sequence of motions having several states of motion with a passing recognition system, including a floor edge, in particular for installing on a floor of a passing area to be monitored, at least one first sensor strip extending along a vertical vector and including several sensors for detecting states of motion within a detection area of the sensors, a computing unit for evaluating the states of motion and/or the sequence of motions. In this case, the method comprises the following steps:

flagging as active the respective sensor of the sensor strip, if said sensor detects something within the detection area thereof and flagging as passive the respective sensor of the sensor strip, if said sensor detects nothing within the detection area thereof, detecting at least one first state of motion and at least one second state of motion by at least the first sensor strip by means of messages of the sensors, wherein the first state of motion and the second state of motion are detected at discrete points in time, which follow each other respectively indirectly or directly, transmitting the states of motion to the computing unit, the computing unit recognizing at least one sequence of motions based on the transmitted states of motion, wherein the first sensor strip, in the installation state thereof, at maximum extends up to a height of 1300 mm, preferably 1200 mm, particularly preferred 1100 mm, in particular preferred 1000 mm, starting at the floor edge of the passing recognition system.

In particular in this case, the first sensor strip can extend at maximum up to a height of 950 mm, in particular 900 mm, in particular 850 mm, in particular 800 mm, starting at a floor edge of the passing recognition system.

In this case in particular, the first sensor strip can extend at minimum from a height of 1 mm, in particular 5 mm, in particular 10 mm, in particular 15 mm, in particular 20 mm, in particular 25 mm, in particular 30 mm, and at maximum up to the indicated height starting at the floor edge of the passing recognition system.

In this case, the floor edge of the passing recognition system denotes the lowest point of the passing recognition system, which is placed on the floor of the passing area. In other words, in the installation state thereof, the first sensor strip extends at maximum up to a height of 1300 mm, in particular 1200 mm, in particular 1100 mm, in particular 1000 mm, in particular 900 mm, in particular 850 mm, in particular 800 mm, starting at the floor of the passing area to be monitored. In this case in particular, the floor edge forms the floor-sided termination of the passing recognition system. In particular, the floor edge can be the lowest point of an installation foot of the passing recognition system.

In this case, a sequence of motions means walking through and/or passing the detection area of at least the first sensor strip. In the context of the disclosure, a state of motion is understood as a snapshot of the detected passing area by at least the first sensor strip. Thus, visually explained, a state of motion indicates, which sensors detect something at what position, for example in the form of a newly recognized object and/or an individual in the respective detection area at a discrete point in time. In particular, a sequence of motions can be recognized based on the temporal comparison of several states of motion. In particular, with further sensor strips being arranged, a single state of motion can likewise comprise the snapshot of the further sensor strip at the same point in time of the snapshot of the first sensor strip.

In this case, the first state of motion does not necessarily have to be the very first state of motion of the respective sequence of motions. It is just significant that the second state of motion is detected chronologically after the first state of motion.

If a certain sensor is flagged as active and another sensor is not, automatically, the other sensor can be flagged as passive or vice versa. In other words, the message can be understood as the status state of the respective sensor. In particular, the message can be realized in the context of a data set, in particular 0 or 1, or in the context of an applied and/or not-applied voltage with regard to the respective sensor, depending on whether or not the respective sensor detects something or nothing.

Obviously in this case, the transmission of the first state of motion, detected at least by the first sensor strip, to the computing unit can be realized temporally following the detection of the first state of motion, whereupon then only the second state of motion is detected and then transmitted to the computing unit. Thus, it is not mandatory that initially several states of motion are detected and only temporally thereafter are transmitted to the computing unit, but any single state of motion can be detected and transmitted. In particular in this case, a state of motion can be filtered, which, compared to the directly preceding state of motion, does not deviate in terms of the messages of the sensors. This means, such a state of motion would not be transmitted in this case to the computing unit or would not be considered by the computing unit.

According to the disclosure, based on the maximum height of the first sensor strip, the passing recognition system can be half-high, and does not have to be embodied man-high. Thus, the passing recognition system can have an overall height according to the maximum height of the sensor strip. In this way, the passing recognition system can extend at maximum up to a height of 1300 mm, preferably 1200 mm, particularly preferred 1100 mm, more particularly preferred 1000 mm, in particular 900 mm, in particular 850 mm, in particular 800 mm, starting at a floor edge. Nevertheless in this case, the method allows for reliably recognizing the sequences of motions. Thus, in particular being able to improve the view in the area of such embodied systems. Furthermore, allowing for respecting design requirements preferring a half-high structure of such systems. Moreover, passing individuals are more at ease when passing, because they feel less constricted. Advantageously, with high precision and also at little distance between two individuals or other mobile objects following each other such a configured inventive method allows for recognizing the respective sequence of motions.

In particular in this case, the detection area of the first sensor strip can extend at minimum from a height of 1 mm, in particular 5 mm, in particular 10 mm, in particular 15 mm, in particular 20 mm, in particular 25 mm, in particular 30 mm, and at maximum up to a height of 1300 mm, preferably 1200 mm, preferably 1100 mm, preferably 1000 mm, particularly preferred 900 mm, particularly preferred 850 mm, particularly preferred 800 mm, starting at the floor edge of the passing recognition system. In particular, the rays of the sensor strip can extend vertically to the vertical vector.

Disposing the sensors along a vertical vector means that the sensors are disposed along a line, wherein the line includes at least one vertical component. Preferably, the sensors are disposed along the vertical vector, wherein the vertical component of the vector amounts at least for 80, in particular 90, in particular 95, in particular 99 percent of the vector. In particular, the sensors of the first sensor strip can be disposed offset on a vertically extending plane or along the vertical vector.

In this case, the passing recognition system can comprise further components, in particular a housing, into which the sensor strip is incorporated, and/or an identification reader and/or a ticket reader and/or in particular a mechanically operated manlock and/or door. A component is understood as the housing, which can house one or more elements of the passing recognition system. However, the housing does not necessarily have to be terminated to the outside, but can comprise rather at least one or more openings and/or cut-outs.

Particularly when performing an access control, an identification reader and/or ticket reader can be disposed. Generally in particular in this case, it can be required to allow the access just for a single individual, potentially with one or more objects, in a single successfully performed access control and/or to document abuses of said rule.

As an alternative or cumulatively however, the disclosure can be applied just for counting individuals and/or objects passing the passing area.

The computing unit can control the sensors, in particular with regard to the operating frequency. In particular, the computing unit can include a transmitter for transmitting the at least one detected state of motion and/or a receiver for receiving the detected states of motion and/or an evaluating unit for recognizing the sequence of motions and/or a supply unit and/or a display for illustrating the at least one state of motion and/or the sequence of motions.

For the detection thereof, a single sensor can have at least one source and at least one receiver and/or detect the detection area thereof by reflexion. In particular, a single sensor can be formed as an optical and/or opto-electronical and/or photo-electric sensor. In particular in this case, cameras, in particular photo cameras and/or video cameras, can be excluded as sensors. In particular, a single sensor can be formed as a light barrier and/or one-way light barrier and/or reflexion light barrier and/or infrared light barrier.

A sensor strip can be formed as a unit of several assembled and/or interconnected sensors, in particular on a printed circuit board. As an alternative, a sensor strip can be formed from several single sensors, in particular with respective distinct line and/or distinct data channel, wherein, in the installation state thereof, the single sensors extend along the vertical vector.

The distance between the sensors of the sensor strip can be always the same or vary from sensor to sensor. In this case, at least one distance, in particular each distance between two sensors can be between 5 mm and 50 mm, in particular between 10 mm and 45 mm, in particular between 15 mm and 40 mm, in particular between 20 mm and 35 mm, in particular between 25 mm and 30 mm.

In particular, the states of motion can be transmitted by a bus, in particular a CAN-bus. In particular, the states of motion can be transmitted serially and/or digitally and/or wirelessly to the computing unit.

In particular, the first sensor strip can have from 2 to 60, in particular from 5 to 50, in particular from 10 to 40, in particular from 15 to 30, in particular 20 to 25 sensors, in particular 24 sensors, in particular 28 sensors.

According to a further development of the present disclosure, at least the first sensor strip includes at least one strip head, in particular comprising several of the upper sensors, and a strip body comprising at least one sensor, in particular several sensors, below the strip head.

The strip head and/or the strip body can be formed respectively as a unit from several assembled and/or interconnected sensors. As an alternative, the strip head and/or the strip body can be formed from several single sensors, in particular with respective distinct line and/or distinct data channel, wherein, in the installation state, the strip head and the strip body extend along the vertical vector.

In particular, the strip head can extend at minimum from a height of 600 mm, in particular 650 mm, in particular 700 mm, in particular 800 mm, in particular 850 mm, in particular 900 mm, and/or at maximum up to a height of 1300 mm, in particular 1200 mm, in particular 1100 mm, in particular 1000 mm, in particular 900 mm, in particular 850 mm, in particular 800 mm, starting at the floor edge of the passing recognition system.

In particular, the strip head and/or the strip body can comprise respectively several sensors. In particular, the strip head can comprise from 2 to 30, in particular from 4 to 25, in particular from 5 to 20, in particular from 10 to 15, in particular 3 sensors. In particular, the strip body can comprise from 2 to 60, in particular from 5 to 50, in particular from 10 to 40, in particular from 15 to 30, in particular from 20 to 25, in particular 20, in particular 24 sensors.

Preferably, recognizing the sequence of motions can comprise recognizing a direction of the sequence of motions and/or recognizing a turn with the help of a second sensor strip including at least one sensor, in particular several sensors, wherein the second sensor strip is disposed next to the first sensor strip, in particular parallel to the first sensor strip.

In this case, the detection area of the sensors is meant to be next to the first sensor strip. This means, the detection areas of both sensor strips are located next to each other. In particular in this case, the two sensor strips can be disposed on a virtual plane. In particular, the second sensor strip can extend along a vertical vector.

Recognizing the direction can be realized in that during a sequence of motions in the direction of the first sensor strip in an first state of motion, are flagged as active the sensors, in particular a certain number of sensors, in particular all sensors, of the second sensor strip and temporally thereafter, in a second state of motion, are flagged as active the sensors, in particular a certain number of sensors, in particular all sensors of the strip head of the first sensor strip.

In particular in a realized passage, in a further state of motion following thereafter, are flagged as passive at first the sensors, in particular a certain number of sensors, in particular all sensors of the second sensor strip, and then, in yet another state of motion following thereafter, are flagged as passive the sensors, in particular a certain number of sensors, in particular all sensors of the strip head of the first sensor strip. Unlike in a passage, in a turn within the detection area of the sensor strips, which corresponds to an abortion of the passage, in the state of motion following thereafter, are flagged as passive at first the sensors, in particular a certain number of sensors, in particular all sensors of the strip head of the first sensor strip and then, in the further state of motion following yet thereafter, are flagged as passive the sensors, in particular a certain number of sensors, in particular all sensors of the second sensor strip.

In a sequence of motions in the direction of the second sensor strip the opposite is respectively valid.

Thus, the direction and/or the turn of the sequence of motions can be reliably recognized. Therefore, the passing recognition system can be performed for passing in both directions.

In particular, the second sensor strip can have from 2 to 30, in particular from 3 to 25, in particular from 4 to 20, in particular from 5 to 15, in particular 8 to 10 sensors. In particular, the second sensor strip can likewise extend along a vertical vector, the vertical component thereof amounting for 80 to 100, in particular for 90 to 95 percent of the vector.

In particular, the second sensor strip can extend at minimum from a height of 5 mm, in particular 10 mm, in particular 100 mm, in particular 400 mm, in particular 800 mm and/or at maximum up a height of the first sensor strip starting at the floor edge. Preferably, the second sensor strip can extend at least beyond the height of the sensor head of the first sensor strip.

The above-described possibilities of embodying the first sensor strip as well as the individual sensors thereof, in particular with regard to the detection and/or the design and/or the distance and/or the transmission of the states of motion are correspondingly valid for the second sensor strip.

Preferably, detecting the at least one state of motion comprises a determination of a number of sensors flagged as active and/or as passive, in particular within the first sensor strip, in particular within the strip head and/or the strip body of the first sensor strip and/or within the second sensor strip. Such determination represents useful information for reliably recognizing the sequence of motions. In particular, such detection can be realized within each state of motion.

Preferably, the sequence of motions is associated to at least one individual and/or at least one object. Thereby, allowing for counting passing individuals and/or objects. An item is understood as an object.

Preferably, the sequence of motions is associated to at least one individual, if, within the first state of motion, are flagged as active all sensors of the strip head of the first sensor strip and/or all sensors of the second sensor strip. Hereby, it is assumed that only an individual within a single state of motion can flag as active all sensors at the height of the strip head and/or of the second sensor strip.

Preferably, the sequence of motions is associated to at least one individual, if, within the sequence of motions, is flagged as active at least once each single sensor of the first sensor strip or each single sensor of the strip body of the first sensor strip. Hereby, providing a reliable recognition of individuals.

Thereby is meant that, in all states of motion of the single sequence of motions, is flagged as active at least once each single sensor of the first sensor strip or each single sensor of the strip body, wherein it is irrelevant, when this is realized over the time of the sequence of motions.

In this case, it is assumed that an individual within the sequence of motions thereof causes at least once an active flagging of each single sensor. In this case, this does not have to happen within a single state of motion, but within a single sequence of motions with all the states of motion thereof included.

In particular, the sequence of motions can be associated to at least one individual, if, within the single state of motion, is flagged as active each single sensor of the first sensor strip or each single sensor of the strip body.

In particular, the sequence of motions can be associated to at least one individual, if, within the first state of motion, is flagged as active at least the topmost sensor of the first sensor strip and/or the topmost sensor of the strip body, and within the second state of motion, at least the lowermost sensor of the sensor strip and/or the lowermost sensor of the strip body, wherein, within the single sequence of motions, is flagged as active at least once each single sensor of the first sensor strip or each single sensor of the strip body.

In particular, the sequence of motions can be associated to at least one individual, if, within the first state of motion, is flagged as active at least the lowermost sensor of the first sensor strip and/or the lowermost sensor of the strip body and, within the second state of motion, at least the topmost sensor of the sensor strip and/or the topmost sensor of the strip body, wherein, within the sequence of motions, is flagged as active at least once each single sensor of the first sensor strip or each single sensor of the strip body.

Preferably, the sequence of motions is associated to at least one individual, if, with regard to the number of sensors flagged as active of the first sensor strip, in particular of the strip body of the first sensor strip, within a single state of motion, is determined at least once a positive difference and/or at least once a negative difference between the states of motion, in particular between states of motion following each other temporally indirectly or directly within the sequence of motions.

Hereby, it is assumed that, within the sequence of motions at least once during the temporally progressing sequence, an individual causes an increasing number and/or at least once during the temporally progressing sequence, a decreasing number of active sensors of the first sensor strip, in particular of the strip body of the first sensor strip. This allows for reliably recognizing a typical gait of an individual.

However usually, an upright guided carry-on bag causes a constant number of active sensors over the time. In this manner, upright guided carry-ons can be reliably recognized, exactly not as an individual.

Preferably, the recognition of the sequence of motions comprises delimiting the sequence of motions from a further sequence of motions based on a separation criterion. This allows for distinguishing a passing individual and/or a passing object from a next individual and/or a next object and thus to count the individuals and/or objects.

Preferably, recognizing the sequence of motions comprises a delimitation of the sequence of motions from a further sequence of motions based on a separation criterion, wherein the separation criterion intervenes, if a certain difference is determined between the number of the sensors flagged as active of the first sensor strip, in particular of the strip head, in particular of the strip body, within the first state of motion, and the number of the sensors flagged as active of the first sensor strip, in particular of the strip head, in particular of the strip body, within the second state of motion.

The separation criterion intervening is understood as delimiting a sequence of motions from another sequence of motions. In particular in this case, the second state of motion can be used already at least as one of the states of motion of the further sequence of motions.

In particular, the separation criterion can intervene at a difference of at least two to twenty, in particular three to fifteen, in particular four to twelve, in particular five to ten active sensors.

Preferably, recognizing the sequence of motions comprises a subdivision of the sequence of motions from a further sequence of motions based on a separation criterion, wherein the separation criterion intervenes, if, within a single state of motion, a certain difference is determined between the number of the sensors flagged as active of the first sensor strip, in particular of the strip head, and the number of the sensors flagged as active of the second sensor strip.

In particular, the separation criterion can intervene at a difference of at least two to ten, in particular three, in particular four, in particular five active sensors.

Such a separation criterion allows for a reliable separation between sequences of motions of single individuals or objects. In particular, it allows for reliably singling individuals even with individuals following each other closely.

As an alternative or cumulatively, the recognition of the sequence of motions can comprise a delimitation of the sequence of motions from a further sequence of motions based on a separation criterion, wherein the separation criterion intervenes, if, within the first state of motion, are flagged as active at least one of the sensors, in particular a certain number of sensors, in particular all sensors, of the strip head and/or of the strip body, wherein, within the second state of motion, are flagged as passive at least one of the sensors, in particular a certain number of sensors, in particular all sensors, of the strip head and/or of the strip body.

In particular, the first state of motion can be filtered, if the first state of motion includes a number up to three, preferably two, particularly preferred one sensor flagged as active of the sensor strip, in particular of the first sensor strip, in particular within the strip body and, in one or more states of motion respectively directly following each other, said number of sensors flagged as active increases by less than three, in particular two. Such filtering reduces the data flow rate.

This means, such a state of motion is not considered for recognizing a sequence of motions. Such states of motion are caused for example by small items, such as bag belts or telescopic tubes of carry-ons held obliquely, and can be disregarded in the method.

As an alternative or cumulatively, single states of motion, which do not change with regard to the directly following point in time, can be filtered.

According to a further aspect of the disclosure, the inventive method is performed computer-implemented, wherein the computing unit and/or an additional computer forms the computer.

In particular for this purpose, a computer program on a data carrier can be employed for performing the method. In particular in this case, at least one step, in particular several steps, in particular all steps of the method can be performed by means of an algorithm running on the computer.

According to a further aspect of the disclosure, a passing recognition system is provided for performing the described method, comprising a floor edge, in particular for installing on a floor of a passing area to be monitored, at least one first sensor strip extending along a vertical vector and including several sensors, a computing unit, wherein the sensor strip, in the installation state thereof, extends at maximum up to a height of 1300 mm, in particular 1200 mm, in particular 1100 mm, in particular 1000 mm, particularly preferred 900 mm, particularly preferred 850 mm, particularly preferred 800 mm, starting at the floor edge of the passing recognition system.

The embodiment possibilities described with regard to the method are correspondingly valid for the passing recognition system.

For example, such passing recognition systems can be employed in airport security or in an office security area.

Preferably, the passing recognition system comprises a second sensor strip including at least one sensor, in particular several sensors, wherein the second sensor strip is disposed next to the first sensor strip, in particular parallel to the first sensor strip, wherein the second sensor strip has fewer sensors than the first sensor strip, and/or wherein the second sensor strip is formed shorter than the first sensor strip and/or wherein the second sensor strip extends beyond the height of the strip head of the first sensor strip. Height of the strip head means the height of the strip head in the installation state thereof starting at the floor edge.

Preferably, a third sensor strip with at least one sensor, in particular at least two sensors is disposed, in particular extending underneath the first sensor strip along a horizontal vector.

Disposing the sensors along the horizontal vector means that the sensors are disposed along a line, wherein the line includes at least one horizontal component. Preferably, the sensors are disposed along the horizontal vector, wherein the horizontal component amounts at least for 80 to 99, in particular for 85 to 95 percent of the vector. In particular, the sensors of the first sensor strip can be disposed offset on a vertically extending plane or along the horizontal vector.

In particular, the third sensor strip can be disposed in a height of 3 to 250 mm, in particular of 5 to 200 mm, in particular of 15 to 165 mm, in particular of 25 to 150 mm, in particular of 30 to 100 mm, in particular of 40 to 50 mm, starting at the floor edge of the passing recognition system and/or starting at the floor of the passing area. In particular, the third sensor strip can comprise from 2 to 50, from 3 to 40, from 5 to 30, from 10 to 21 sensors.

In particular, foot recognition of an individual can be realized with the third sensor strip. In particular, recognizing the sequence of motions can comprise foot recognition of an individual, wherein the sequence of motions is associated to a foot of an individual, if, at a certain discrete point in time, are flagged as active a certain number, in particular of the lower sensors of the strip body of the first sensor strip, and simultaneously are flagged as active at least the one sensor, in particular the at least two sensors of the third sensor strip, wherein the at least one sensor of the third sensor strip is disposed in the direction of the sequence of motions behind the first sensor strip.

In particular in this case, the first sensor strip, in the installation state thereof, can extend at maximum up to a height of 600 mm, preferably 500 mm, particularly preferred 400 mm, in particular preferred 300 mm, starting at the floor edge of the passing recognition system. Also in such low-level embodiment of the first sensor strip, the states of motion can be nevertheless sufficient for foot recognition of an individual, as for this purpose just the lower area of the leg of an individual is decisive.

In particular, the sequence of motions can be associated to an individual, if the sequence of motions is associated to a foot of an individual.

As an alternative or cumulatively to the second sensor strip, the third sensor strip can realize direction recognition of the sequence of motions.

In particular in this case, recognizing the direction of motion of the sequence of motions can be realized in that at least one first sensor of the third sensor strip and a second sensor of the third sensor strip in the direction of motion are disposed next to the first sensor, and are flagged as active within the sequence of motions, wherein the second sensor is flagged as active at a later point in time than the first sensor.

The above-described possibilities of the embodiment of a sensor strip as well as the single sensors thereof, in particular with regard to the detection and/or the design and/or the distance and/or the transmission of the states of motion are correspondingly valid for the third sensor strip.

In particular, the passing recognition system can include at least one mechanical barrier for blocking the passing area.

In particular, when disposing a mechanical barrier, the third sensor strip can thereby extend over a passing area locally in front of and/or after the barrier. In this manner, it can be reliably determined whether or not an individual and/or an object have/has actually passed the barrier.

In particular, the states of motion can be converted by means of a conversion unit prior to and/or after transmission to the computing unit.

In particular, the states of motion can be illustrated on a display of the computing unit and/or an additional display of the passing recognition system.

In particular, the passing recognition system can comprise a device, in particular a camera, for biometric recognition, in particular facial recognition.

In particular, the passing recognition system can include at least one head sensor for detecting a detection area, wherein the detection area of the head sensor is located above a housing of the passing recognition system. In other words, the head sensor is formed and/or disposed such that the detection area thereof detects above the highest point of a housing of the passing recognition system starting at the floor edge of the passing recognition system. Thereby is meant that the detection area of the head sensor is located above a virtual horizontal plane, wherein the plane comprises the highest point of the housing. Thereby, by means of a passing recognition system having a reduced height, enabling to detect motion data above at least the housing. Thereby, improving recognizing the sequence of motions even further.

In particular in this case, the housing can be formed as a guide element, in particular for guiding through individuals through the passing area. In particular, the housing can be delimited to the top by a handrail as the upper housing part, in particular wherein the head sensor can be disposed in or at the handrail.

In particular, the detection area of the head sensor can be at a height between 1000 mm to 2200 mm, in particular 1100 mm to 2100 mm, in particular 1150 mm to 2000 mm, in particular 1200 mm to 1900 mm, in particular 1250 mm to 1800 mm, in particular 1300 mm to 1700 mm, in particular 1350 mm to 1600 mm, in particular 1400 mm to 1500 mm, starting at the floor edge of the passing recognition system. In particular, the detection direction of the head sensor can be oriented obliquely upwards.

In particular, the head sensor is able to detect the detection area thereof through an area of the housing, which is transparent for the head sensor. In particular, several head sensors can be disposed. In particular, the head sensors can be disposed along a horizontal vector, in particular next to each other and/or along a vertical vector, in particular one above the other.

The above-described possibilities for embodying a sensor strip, in particular with regard to the detection and/or the design and/or the transmission of the states of motion are correspondingly valid for the head sensor. In particular, the head sensor can be embodied as a reflexion sensor. As a reflexion sensor, the head sensor detects the detection area thereof by means of reflexion. Thus, such a sensor does not require a two-part embodiment of transmitter and receiver, but can be embodied in one part. In particular, the head sensor can digitally or serially generate and/or transmit the message. In particular, the head sensor can be embodied opto-electrically. In particular, the head sensor can be embodied as an infrared sensor.

In particular, the sequence of motions can be associated to an individual, if, within the sequence of motions, the head sensor is flagged as active at least once, in particular several times. In this case, it is assumed that only an individual causes an active flagging of the head sensor.

In particular, the passing recognition system can comprise at least one first housing, wherein are disposed in and/or at the first housing one or more elements of the passing recognition system, in particular the first sensor strip and/or the second sensor strip, and/or the third sensor strip and/or the head sensor and/or a scanner. In particular, the passing recognition system can comprise at least one second housing, wherein are disposed in and/or at the second housing one or more elements of the passing recognition system, in particular the head sensor.

BRIEF DESCRIPTION OF THE DRAWINGS

Further details and advantages of the disclosure shall be explained in the following based on exemplary embodiments partially diagrammatically shown in the Figures. The same reference numerals respectively identify elements having the same function and manner of operation. It shows.

DETAILED DESCRIPTION OF THE DRAWINGS

Figure 1:
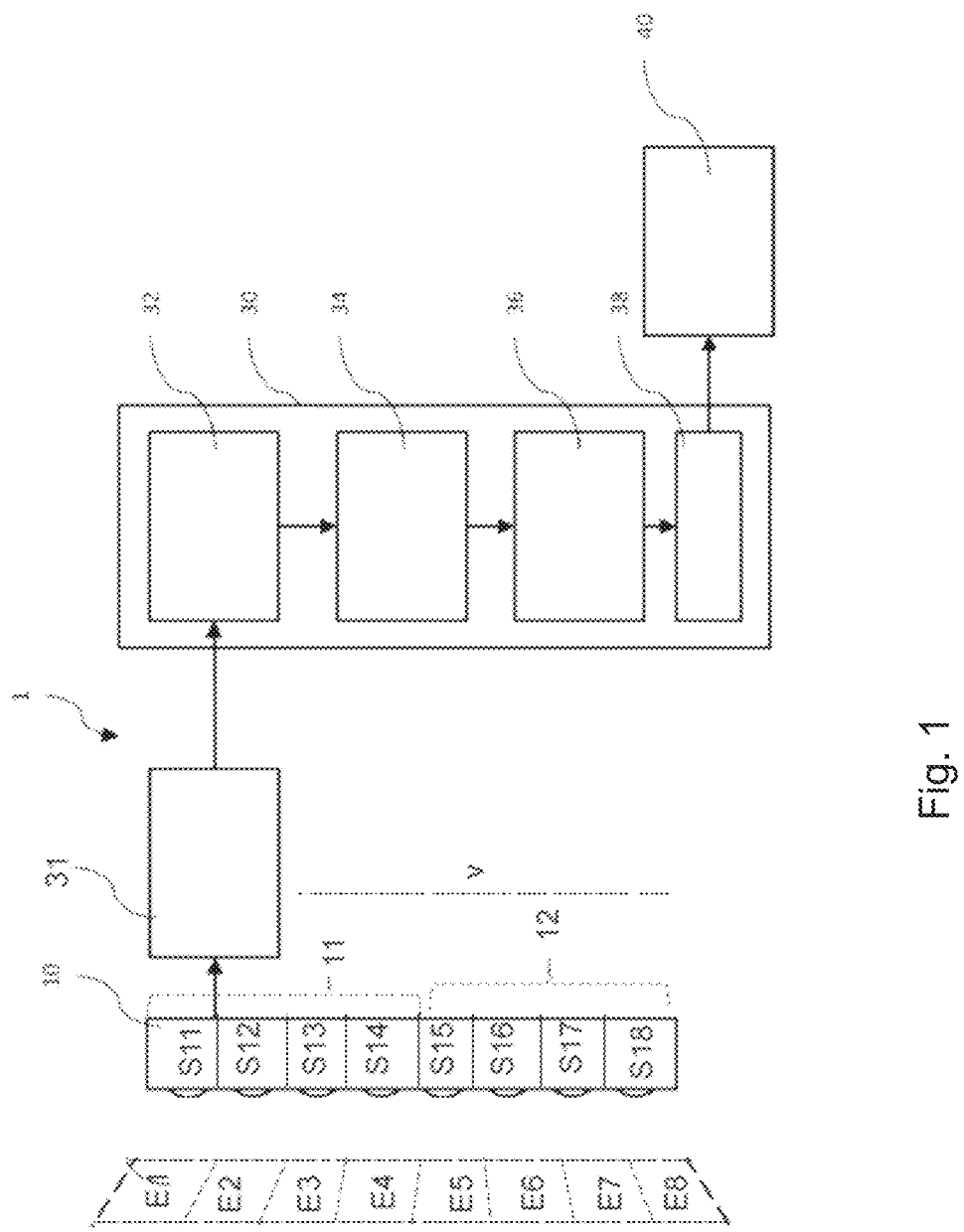
FIG. 1 a flow diagram of an embodiment of an inventive method.

FIG. 1 shows a flow diagram of an inventive method with a passing recognition system 1, comprising a first sensor strip 10 with the sensors S11 to S18 for detecting states of motion within a detection area E1 to E8, a transmitter 31 for transmitting the states of motion, a computing unit 30 with a receiver 32 for receiving the states of motion, with an evaluation unit 34 for evaluating the states of motion, with a supply unit 36 for supplying the states of motion 2, with a conversion unit 38 for converting the states of motion 2, and with a display 40 of a recognized sequence of motions.

In this case, the first sensor strip 10 extends along the vertical vector v, wherein the vertical component thereof is 100 percent. The first sensor strip 10 is divided into a strip head 11 with the upper four sensors S11 to S14 and an exemplary strip body 12 with the lower four sensors S15 to S18.

Figure 2:
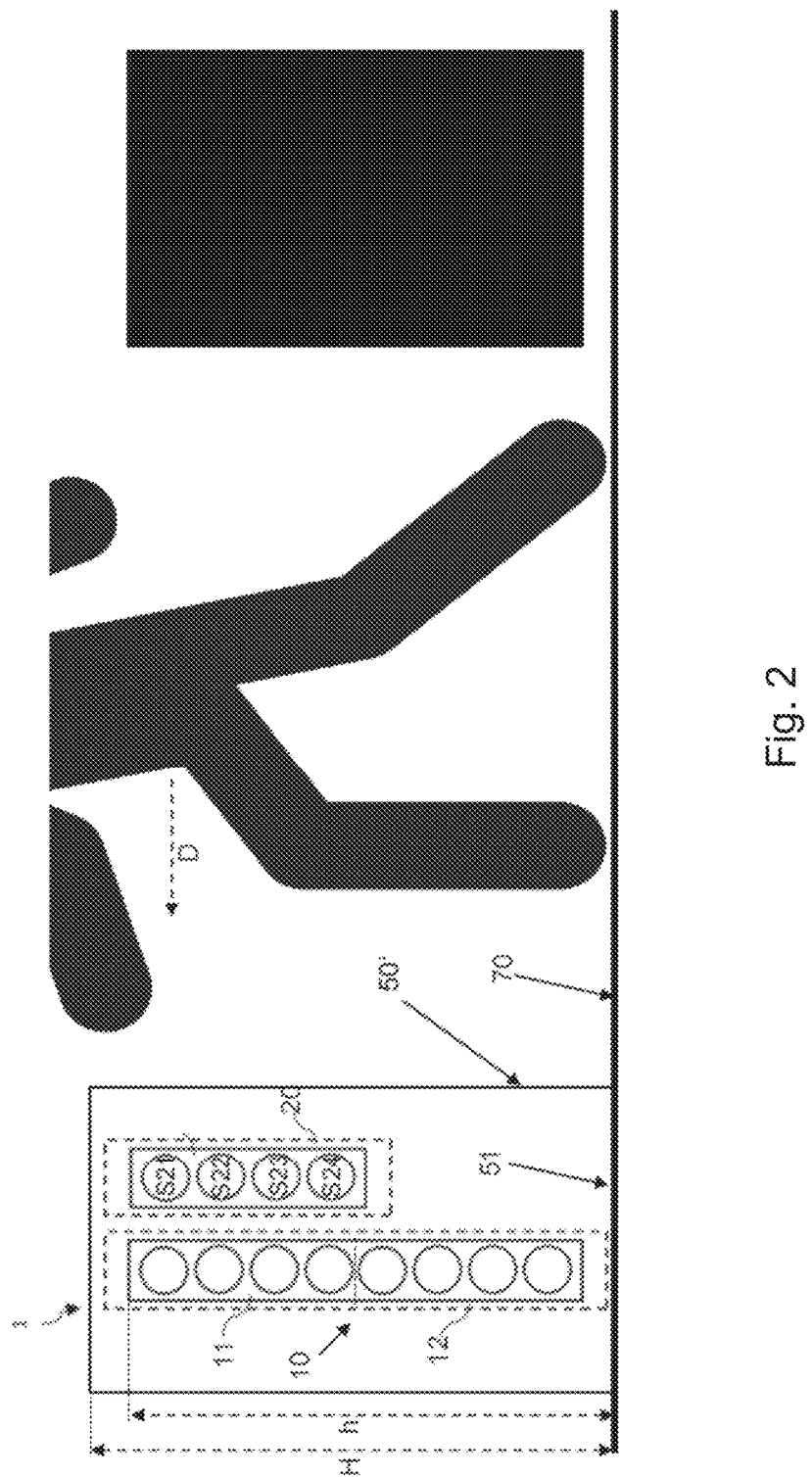
FIG. 2 a lateral view of a first embodiment of an inventive passing recognition system having two sensor strips, FIG. 3a a first illustration of a sequence of motions based on a plurality of detected states of motion.

FIG. 2 shows a lateral view of an embodiment of an inventive passing recognition system 1 with a first sensor strip 10 and, disposed next and parallel to the first sensor strip 10, a second sensor strip 20 with the sensors S21 to S24 thereof, with the floor edge 51 and a housing 50'. The floor edge 51 is set on the floor 70 of the passing area. The first sensor strip 10 extends up to a height h starting at the floor edge 51. Simultaneously, the first sensor strip 10 extends up to a height h starting at the floor 70 of the passing area. Furthermore are illustrated an individual and an upright guided luggage moving in the direction D. The number of sensors, the length, as well as the installation height of the second sensor strip 20 correspond to the strip head 11 of the first sensor strip 10. The housing 50' has an overall height H.

The second sensor strip 10 serves for an exemplary complementary detection of states of motion 2, in order to allow the computing unit 30 evaluating the direction of the recognized sequences of motions 4. This is explained in more detail based on FIG. 4a and FIG. 4b.

Figure 3A:
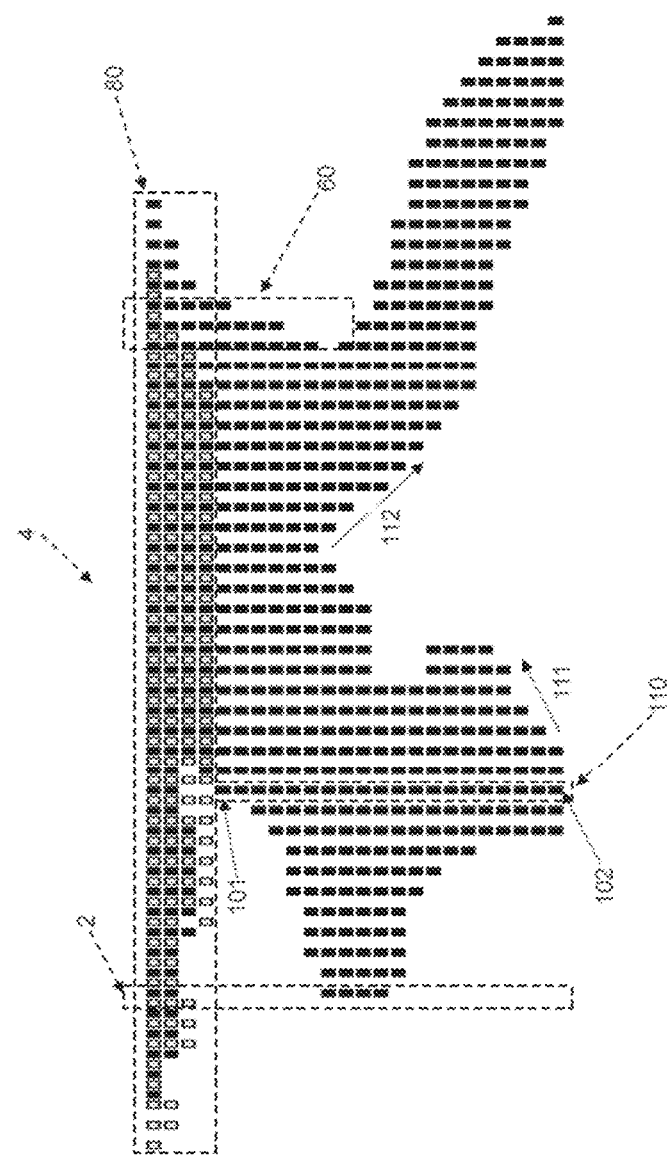
FIG. 3b a second illustration of a sequence of motions based on a plurality of detected states of motion.

FIG. 3a shows a plurality of states of motion 2 of an individual, who, according to FIG. 2, passes the passing recognition system 1. The black filled squares symbolize sensors of the first sensor strip 10 flagged as active, herein, differing from FIG. 2, with altogether 24 sensors. The non-filled or grey filled squares symbolize sensors of the second sensor strip 20 flagged as active with altogether four sensors. The empty spots symbolize sensors of the first sensor strip 10 and of the second sensor strip 20 flagged as passive. Each column represents a detected state of motion 2. The plurality of columns results from the temporal progress of the detected states of motion 2, respectively detected by the first sensor strip 10 and the second sensor strip 20, chronologically from left to right. Each row represents the detection of respectively one sensor of the sensor strips 10, 20 over the time from left to right. Thus, the upper four rows 80 show respectively the detected states of motion 2 of the sensors of the strip head 11 of the first sensor strip 10 and of the second sensor strip 20. The lower 20 rows show respectively the detected states of motion 2 of the sensors of the strip body 12 of the first sensor strip 10, wherein, differing from FIG. 2, the strip body 12 includes twenty sensors.

Furthermore, in a state of motion 110 all sensors of the strip body are flagged as active at least once, wherein furthermore are flagged as active both the topmost sensor in 101 and the lowermost sensor in 102. Furthermore in the following, a positive difference is determined between the states of motion over the time within the sequence of motions 4, namely a decreasing number of active sensors of the strip body 12, which the arrow 111 indicates.

Furthermore in the following, a negative difference is determined between the states of motion, namely an increasing number of active sensors of the strip body 12 over the time within the sequence of motions 4, which the arrow 112 indicates. Moreover, temporally prior to the state of motion 110, already an increase in active sensors of the strip body 12 is determined. This results in associating the sequence of motions 4 to an individual.

Furthermore, is illustrated in an area 60, when a separation criterion according to the inventive method intervenes and thus delimits a sequence of motions 4 from a further sequence of motions. In the area 60 are flagged as passive both single sensors of the strip head 11 as well as of the second sensor strip 20 and also single sensors of the strip body 12. This results in the intervention of the separation criterion and therefore, the sequence of motions 4 is deemed terminated.

Figure 3B:
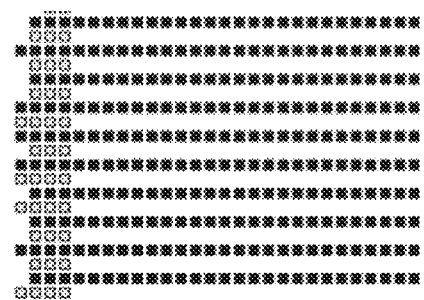

Unlike FIG. 3a, FIG. 3b illustrates states of motion of an upright guided luggage, according to FIG. 2, right side. Herein, differing from FIG. 3a, no differences in the number of sensors in the strip body 12 flagged as active between the states of motion are determined within the sequence of motions over the time. Therefore, this sequence of motions is not associated to an individual, but to an object, for example.

Thus, the inventive method and the inventive passing recognition system allow for reliably recognizing individuals with simultaneous low-level embodiment of the passing recognition system 1.

Figure 4A:
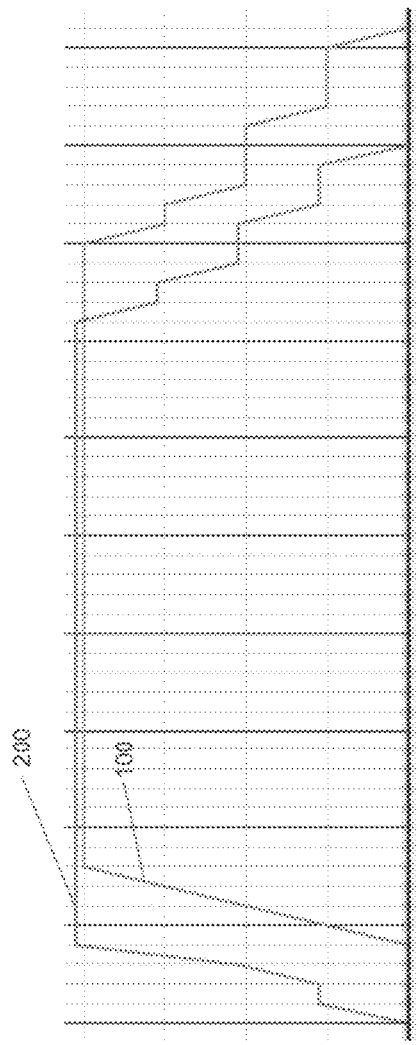
FIG. 4a an illustration of direction recognition.

FIG. 4a illustrates the temporal progress of the number of active sensors of the top four rows 80 according to FIG. 3a. The progress 100 corresponds to the strip head 11 of the first sensor strip 10 and the progress 200 corresponds to the second sensor strip 20. Initially in the first step, are flagged as active all four sensors of the second sensor strip 20, and temporally thereafter all four sensors of the strip head 11. Initially, in the second step are flagged as passive all sensors of the second sensor strip 20, and temporally thereafter all sensors of the strip head 11 of the first sensor strip 10. This results in recognizing the direction D of the sequence of motions as illustrated in FIG. 2 from right to left.

Figure 4B:
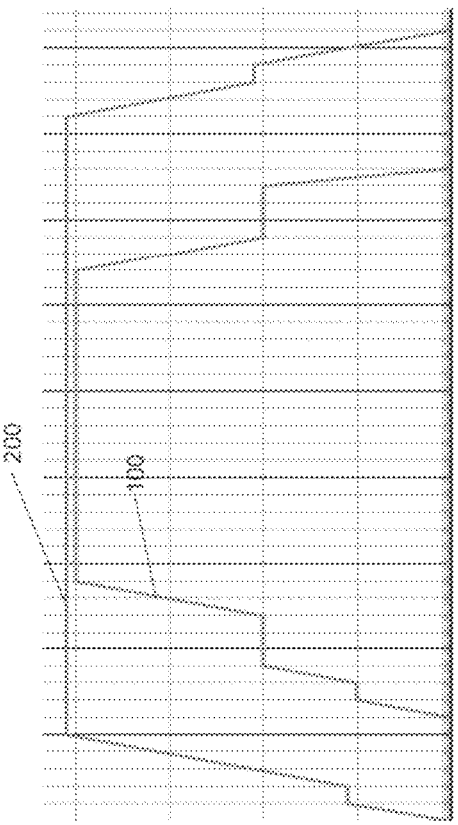
FIG. 4b an illustration of turn recognition.

In contrast thereto, FIG. 4b illustrates a turn of the sequence of motions, wherein, unlike described previously, in the second step initially are flagged as passive all sensors of the strip head 11 of the first sensor strip 10 and temporally thereafter all sensors of the second sensor strip 20. This results in recognizing a turn of the sequence of motions.

Figure 5:
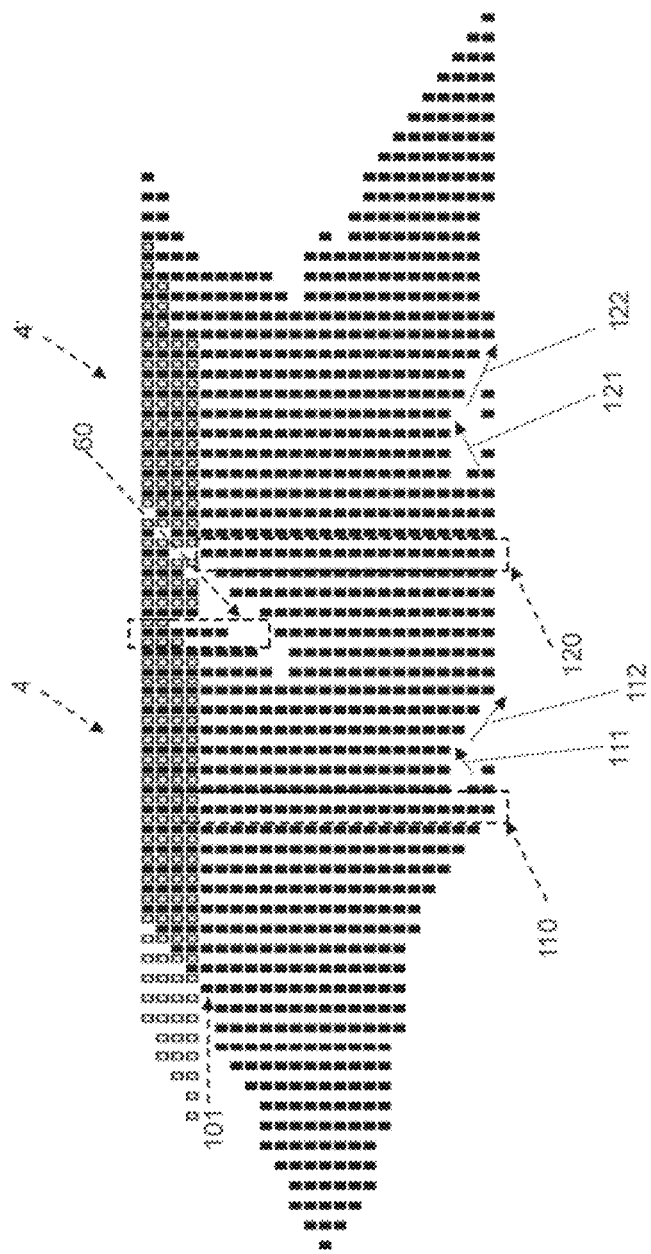
FIG. 5 a third illustration based on a plurality of detected states of motion.

FIG. 5 shows a plurality of states of motion 2 of an individual and of a further individual following each other closely. Essentially, associating the sequence of motions 4 to an individual is realized analogously to FIG. 3a. All sensors flagged as active of the strip body 12 in 110, the decreasing number of active sensors of the strip body 12 according to arrow 111, as well as the increasing number of active sensors of the strip body 12 according to arrow 112 result herein in associating the sequence of motions 4 to an individual. In the area 60, are flagged as passive both single sensors of the strip head 11 as well as of the second sensor strip 20 and also single sensors of the strip body 12. This results in the separation criterion intervening, and therefore, the sequence of motions 4 is deemed as terminated, wherein simultaneously the next sequence of motions 4' starts. All sensors flagged as active of the strip body 12 in 120, the decreasing number of active sensors of the strip body 12 according to arrow 121, as well as the increasing number of active sensors of the strip body 12 according to arrow 122 result herein in associating the sequence of motions 4' to an individual.

Thus, the inventive method and the inventive passing recognition system allow for reliably recognizing single individuals with simultaneous low-level embodiment of the passing recognition system 1 and for individuals following each other closely.

Figure 6:
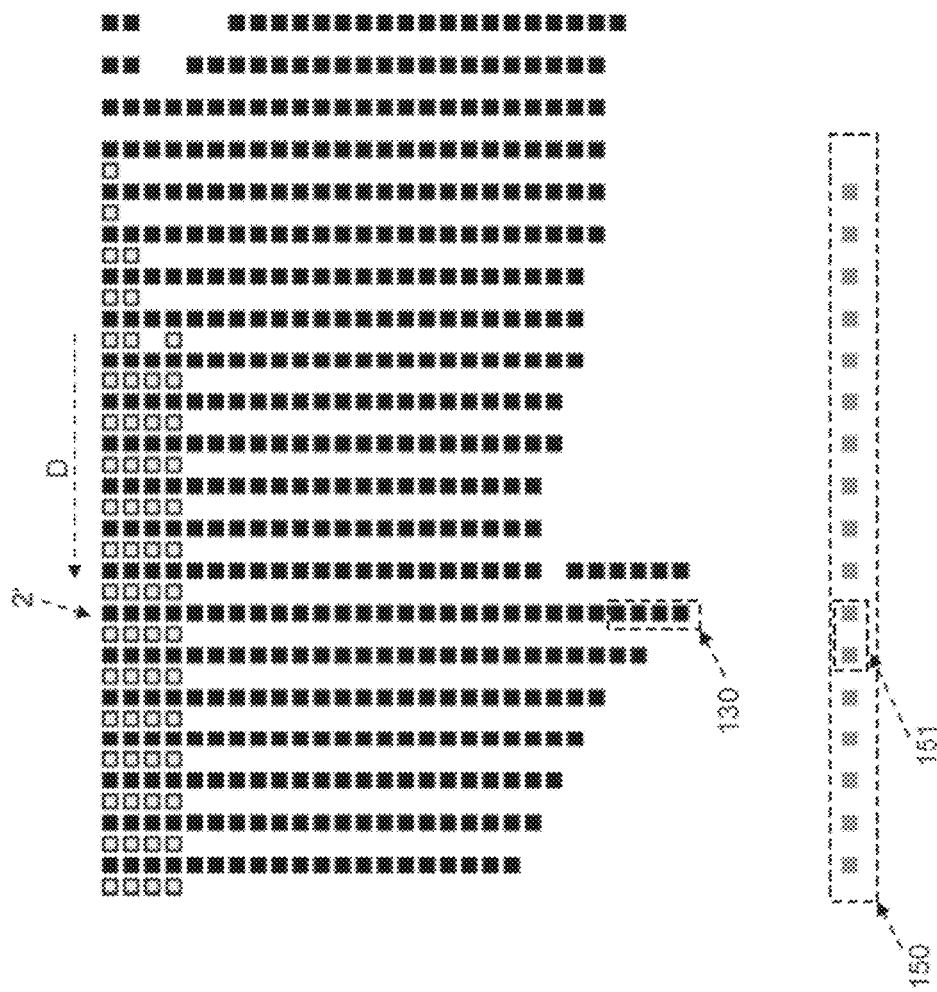
FIG. 6 a fourth illustration of a sequence of motions based on a plurality of detected states of motion.

FIG. 6 shows a plurality of states of motion 2 of an individual with a sequence of motions from right to left according to FIG. 2, which a passing recognition system 1 according to FIG. 2 detects, wherein the strip body 12 of the first sensor strip 10 includes twenty-four sensors and additionally, a third horizontally extending sensor strip is disposed underneath the first sensor strip 10. In this case, the area 150 depicts the state of motion, which the third sensor strip detects, however, within the single state of motion 2'. In this state of motion 2', are flagged as active the four lower sensors of the sensor strip 12, illustrated by area 130. Simultaneously, in the discrete point in time of the state of motion 2', are flagged as active two sensors, illustrated by area 151, wherein the one sensor is located locally below the first sensor strip 10 and the second one behind the first sensor strip 10 in the direction of motion D. In this case, the direction of motion is recognized analogously to the explanation of FIG. 4a, so that it can be deduced, which one of the sensors of the third sensor strip is located behind the first sensor strip 10. Thereby, the illustrated sequence of motions is associated to a foot of an individual and thus to an individual.

Thus, the inventive method and the inventive passing recognition system allow for reliably recognizing single individuals, with simultaneous low-level embodiment of the passing recognition system 1, and with individuals following each other closely.

Figure 7:
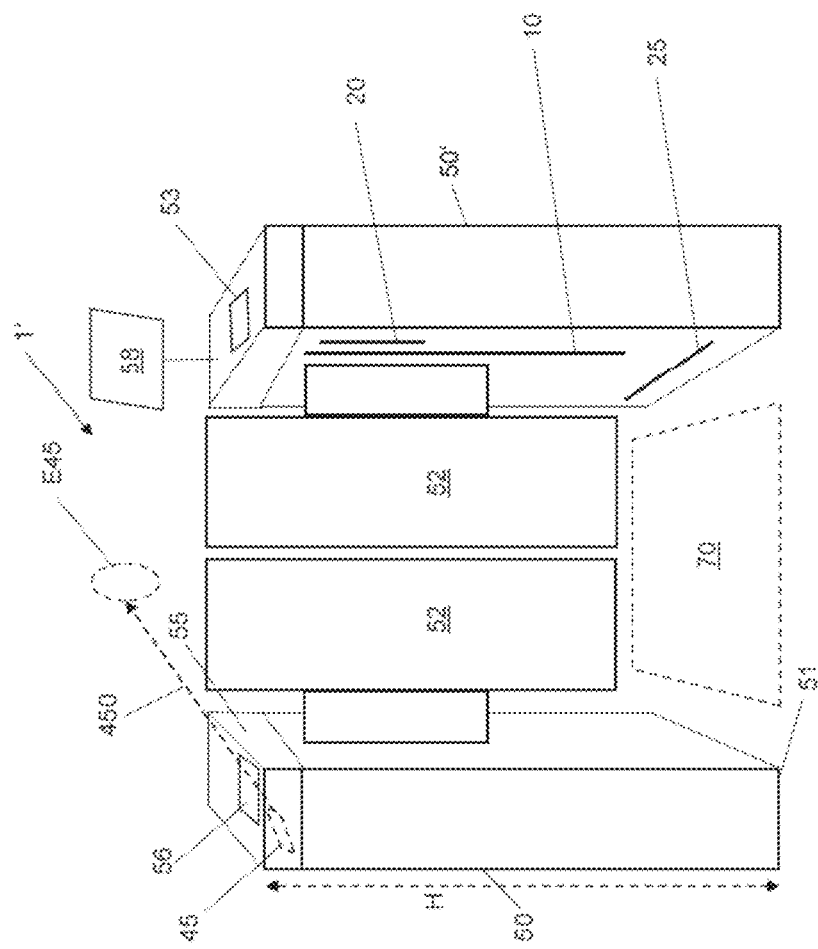
FIG. 7 a perspective view of a second exemplary embodiment of an inventive passing recognition system.

FIG. 7 shows a view of a second exemplary embodiment of an inventive passing recognition system 1' with a scanner 53, two displaceable doors 52, a passing status display 58, a diagrammatically illustrated third sensor strip 25, and a head sensor 45 for detecting a detection area E45 above the first housing 50' and the second housing 50. In this case, the head sensor 45 is disposed in a handrail 55, which is disposed as an upper part of the housing 50, and thereby detects the detection area E45 thereof through an area of the handrail 55, which is transparent for the head sensor 45. In this case, the arrow 450 represents the detection direction of the head sensor 45 extending obliquely upwards. The detection area E45 is located above the housing 50, 50' respectively with the height H and above 1200 mm starting at the floor 70 of the passing area. In this case, the first sensor strip 10 and the second sensor strip 20 are diagrammatically illustrated and essentially correspond to the previous embodiments.

Such a passing recognition system allows for reliably recognizing individuals, with simultaneous low-level embodiment of the housings 50, 50' and/or the passing recognition system 1.

The invention claimed is:

1. A method for non-contact monitoring of at least one sequence of motions having several states of motion with a passing recognition system, including a floor edge, for installing on a floor of a passing area to be monitored, at least one first sensor strip extending along a vertical vector and including several sensors for detecting states of motion within a detection area of the sensors, a computing unit for evaluating the states of motion and the sequence of motions, wherein the method includes the following steps:

flagging as active the respective sensor of the sensor strip, if said sensor detects something within the detection area thereof and flagging as passive the respective sensor of the sensor strip, if said sensor detects nothing within the detection area thereof, detecting at least one first state of motion and at least one second state of motion by at least the first sensor strip by means of messages from the sensors, wherein the first state of motion and the second state of motion are detected at discrete points in time, which follow each other respectively indirectly or directly, and transmitting the states of motion to the computing unit, the computing unit recognizing at least one sequence of motions based on the transmitted states of motion, wherein the first sensor strip, in the installation state thereof, at maximum extends up to a height of 1300 mm, starting at the floor edge of the passing recognition system, wherein the computing unit recognizing the sequence of motions comprises recognizing a direction of the sequence of motions or recognizing a turn with the help of a second sensor strip including at least one sensor, wherein the second sensor strip is disposed next to the first sensor strip, parallel to the first sensor strip, wherein the second sensor strip has fewer sensors than the first sensor strip, and/or wherein the second sensor strip is formed shorter than the first sensor strip and/or the second sensor strip extends beyond the height of a strip head of the first sensor strip.

2. The method according to claim 1, wherein at least the first sensor strip includes the strip head comprising at least one of the upper sensors, and, below the strip head, a strip body comprising at least one sensor.

3. The method according to claim 2, wherein detecting the at least one state of motion comprises a determination of a number of sensors flagged as active or as passive, within the first sensor strip, within the strip head or the strip body of the first sensor strip or within the second sensor strip.

4. The method according to claim 1, wherein the sequence of motions is associated to at least one individual and/or to at least one object.

5. The method according to claim 1, wherein the sequence of motions is associated to at least one individual, if, within the first state of motion, are flagged as active all sensors of the strip head of the first sensor strip and/or all sensors of the second sensor strip.

6. The method according to claim 2, wherein the sequence of motions is associated to at least one individual, if, within the sequence of motions, is flagged as active at least once each single sensor of the first sensor strip or each single sensor of the strip body of the first sensor strip.

7. The method according to claim 2, wherein the sequence of motions is associated with at least one individual, if, with regard to the number of sensors flagged as active of the first sensor strip, within a single state of motion, at least once a positive difference or at least once a negative difference between the states of motion is determined.

8. The method according to claim 1, wherein recognizing the sequence of motions comprises delimiting the sequence of motions from a further sequence of motions based on a separation criterion.

9. The method according to claim 2, wherein recognizing the sequence of motions comprises a delimitation of the sequence of motions from a further sequence of motions based on a separation criterion, wherein the separation criterion intervenes, if a certain difference is determined between the number of the sensors flagged as active of the first sensor strip, of the strip head, of the strip body, within the first state of motion, and the number of the sensors flagged as active of the first sensor strip, of the strip head, of the strip body, within the second state of motion.

10. The method according to claim 1, wherein recognizing the sequence of motions comprises a subdivision of the sequence of motions from a further sequence of motions based on a separation criterion, wherein the separation criterion intervenes, if, within a single state of motion, a certain difference is determined between the number of the sensors flagged as active of the first sensor strip, of the strip head, and the number of the sensors flagged as active of the second sensor strip.

11. A computer-implemented method according to claim 1, wherein the computing unit and/or an additional computer forms the computer.

12. A passing recognition system for performing the method according to claim 1, comprising a floor edge), for installing on a floor of a passing area to be monitored, at least one first sensor strip extending along a vertical vector and including several sensors, a computing unit, wherein, in the installation state thereof, the first sensor strip extends at maximum up to a height of 1300 mm, starting at the floor edge of the passing recognition system, wherein the passing recognition system comprises a second sensor strip including at least one sensor, wherein the second sensor strip is disposed next to the first sensor strip, parallel to the first sensor strip, wherein the second sensor strip has fewer sensors than the first sensor strip, and/or wherein the second sensor strip is formed shorter than the first sensor strip and/or the second sensor strip extends beyond the height of the strip head of the first sensor strip.

13. The passing recognition system according to claim 12, wherein extending underneath the first sensor strip along a horizontal vector, is disposed a third sensor strip with at least one sensor.

* * * * *